United States Patent [19]
Chretien

[11] Patent Number: 4,538,926
[45] Date of Patent: Sep. 3, 1985

[54] TEMPERATURE INDICATING DEVICE

[76] Inventor: Michèle Chretien, 15 ter, Rue Nationale, La Queue lez Yvelines, France, 78940

[21] Appl. No.: 467,323

[22] Filed: Feb. 17, 1983

[30] Foreign Application Priority Data

Feb. 25, 1982 [FR] France .................. 82 03315

[51] Int. Cl.³ .................................. G01K 11/12
[52] U.S. Cl. .................................. 374/150; 374/162; 426/88
[58] Field of Search .................. 374/162, 161, 150; 426/88; 116/216

[56] References Cited
U.S. PATENT DOCUMENTS

| | | | |
|---|---|---|---|
| 3,696,675 | 10/1972 | Gilmour | 374/162 X |
| 3,864,976 | 2/1975 | Parker | 374/150 X |
| 4,070,912 | 1/1978 | McNaughton | 374/162 |
| 4,156,365 | 5/1979 | Heinmets et al. | 374/162 |
| 4,292,916 | 10/1981 | Bradley et al. | 426/88 X |
| 4,301,054 | 11/1981 | Buirley et al. | 374/162 X |
| 4,382,063 | 5/1983 | Romito et al. | 374/162 X |
| 4,388,139 | 6/1983 | Fuller | 374/162 X |

Primary Examiner—Daniel M. Yasich
Attorney, Agent, or Firm—Sandler & Greenblum

[57] ABSTRACT

For use in sensing the temperature of a bottle or the like, a device formed of a thin, supple support 1, an element 2 black in color, an element 3 axial with respect to the element 2 constituted by an at least binary mixture of cholesteric liquid crystals, a strip 4 colored from red to violet according to the colors of the white light spectrum, a symbolic mark 5 disposed in the zone of color corresponding to the appropriate temperature of use of the liquid contained in the bottle.

6 Claims, 3 Drawing Figures

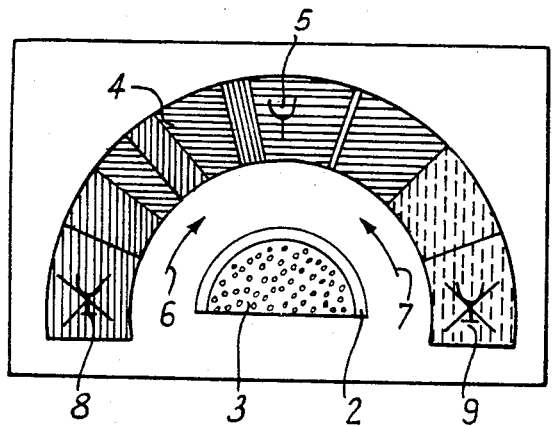
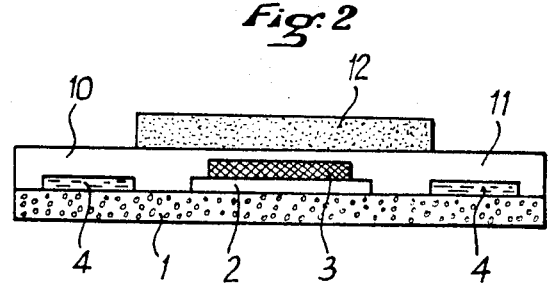
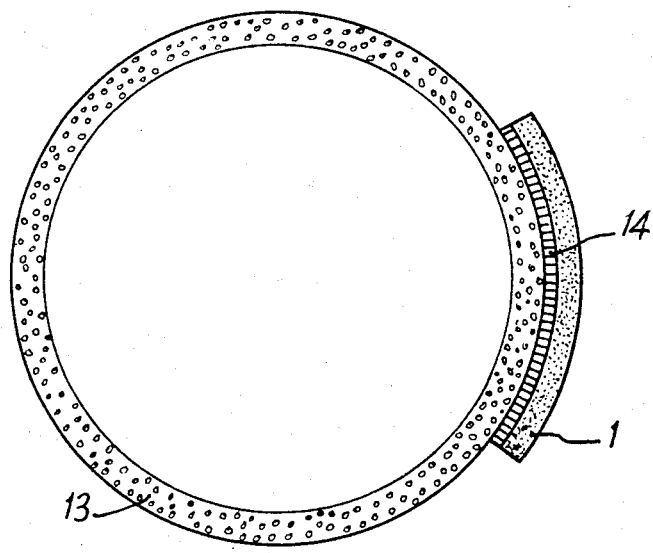

TEMPERATURE INDICATING DEVICE

The present invention essentially relates, by way of new product, to a relatively thin, supple, temperature indicating device, comprising a support on which is disposed a heat-sensitive substance, adapted to be fixed, continuously and intimately, on a rigid support for which a knowledge of its relative thermal state is required.

It is known how advantageous it would be to know, immediately and rapidly, the temperature of a bottle or a recipient containing a liquid intended, for example, for human consumption. By way of example, mention wines must be consumed at an appropriate temperature which varies depending on their origin, for the consumer to be able to appreciate them under optimum conditions. Custom has it that certain wines are often consumed after having remained for a few hours in the place where they are tasted. It appears that this practice does not enable the optimum conditions of tasting to be brought together since a number of red wines must be consumed at a temperature of between 13° and 17°, whilst the ambient temperature in dwellings is very generally between 18 and 20 degrees Centigrade, and that in the absence of any indication of the temperature of the liquid contained in the bottle, the user can only with difficulty vary the thermal surroundings of the bottle for the liquid contained therein to reach the appropriate temperature for tasting. Champagne must be consumed at a temperature close to 6 degrees Centigrade and is thus very frequently immersed in a container containing water and melting ice whose temperature is very slightly above 0 degrees Centigrade, without the user being able to estimate the optimum temperature for tasting.

The value of very simple, inexpensive devices indicating the temperature of liquids intended for human consumption, is, therefore, evident.

Known processes for supplying users with an indication of the temperature of the liquid contained in a bottle are constituted by thermometric systems which generally furnish an absolute value of the temperature expressed in degrees Centigrade. In the absence of any clear and immediate reference, the consumer cannot make a rapid association between the absolute value of the temperature and the optimum temperature of tasting of the liquid contained in the bottle. Furthermore, the known devices are independent of the bottle and are very generally fixed mechanically thereon, the consequence of which is an inexact measurement of the temperature of the liquid contained in the bottle since there is a very high thermal impedance between the device and the outer surface of the bottle.

Other devices, particularly those provided with one end immersed in the liquid, present the drawback of only being usable after the bottle has been opened, which renders them unsuited to monitoring the temperature of certain liquids such as for example Champagne or beers.

Other temperature indicator devices use the property of certain heat-sensitive substances and particularly cholesteric liquid crystals, of changing colour as a function of a variation in temperature. Presently known devices of this type are based on effecting a rotatory polarization of white light for a very slight variation in temperature generally included between 2 and 5 degrees Centigrade, this corresponding from the visual standpoint to a very rapid variation of the colour from red to violet when the temperature of the heat-sensitive substance increases.

The indication of temperature over a wide range can therefore not be obtained by this process by means of one sole heat-sensitive substance and it is necessary to use substances of different natures of which the transition between the smectic state and the cholesteric state takes place at different temperatures. Very generally, these transition states are associated with the measurement of the temperature in the form of a visual display appearing in the form of figures or letters indicating an absolute value of the temperature. Such a process requiring the use of several different substances is delicate to produce and its cost is high.

The present invention also uses heat-sensitive substances, particularly based on cholesteric liquid crystals, but its principle is radically different, characterized in that the range of temperature between the smectic and cholesteric states is large and included between 0.5 and 15 degrees, and move narrowly between 6 and 15 degrees, Centigrade. Between temperature T1 of the smectic state and temperature T2 of the cholesteric state, the appearance of a coloration of the heat-sensitive substance at a perfectly defined temperature may therefore be associated biunivocally and reversibly. Such a novel process makes it possible to dispense entirely with an absolute measurement of the temperature and to obtain a relative measurement by comparison with one or more reference colours corresponding to one of the transitory states between the smectic state and the cholesteric state.

Such a process necessitates the presence only of one mixture of heat-sensitive substances, which renders the process easy to perform and inexpensive.

The invention will be more readily understood and other purposes, characteristics, details and advantages thereof will appear more clearly in the course of the following explanatory description, made with reference to the accompanying schematic drawings, given solely by way of example illustrating an embodiment of the invention, and in which:

FIG. 1 shows a view of the device according to the invention.

FIG. 2 shows a view in section of the structure of a device according to FIG. 1.

FIG. 3 shows a view in section of a bottle provided with the device according to the invention.

FIG. 1 schematically shows a device indicating a relative value of the temperature. Such a device comprises a support 1 advantageously constituted by a thin sheet of coated paper or plastics material. Element 2 is for example centrally positioned and has a diameter greater than 1 centimeter and less than 6 centimeters. Support 1 is imprinted with element 2 which is 1 by an opaque layer black in colour an element 3 axially positioned with respect to element 2, has a diameter greater than 0.9 centimeter and less than 5.9 centimeters, and is constituted by a regular layer of a mixture of heat-sensitive substances of thickness greater than 2.5 micrometers and less than 100 micrometers a strip 4 advantageously being substantially in the form of a ring or half-ring, concentric with respect to the central element 3 and whose coloration varies from one of its ends to the other from red to violet depending on the colours obtained by decomposition of the solar light is provided. A symbolic mark 5 is positioned in the zone of colour corresponding to the appropriate temperature of use of the fluid contained in the bottle on which the device is affixed. Arrows or symbols 6 and 7, indicate the direction of variation of the colours upon an increase or decrease in the temperature of the bottle on which the device is fixed, while marks 8 and 9 indicate undesirable temperature states.

FIG. 2 shows a view in section of the device, in which are seen the elements 1, 2, 3 and 4, mentioned above, as well as the element 10 advantageously constituted by a varnish, a coating or a transparent, water- and steam-tight plastics film and whose object is to protect the heat-sensitive element 3 from being affected by water or steam which might alter the sensitivity of said heat-sensitive element. The transparent surface 10 may advantageously include chemical substances absorbing ultra-violet radiation, which has for its effect to increase the temporal stability of the heat-sensitive element.

According to another variant of the invention, the device may be coated with a thermally insulating transparent film 11, with a thickness of between 150 and 600 micrometers, so as to increase the thermal impedance between the outer wall of the heat-sensitive element and the ambient medium. This serves to limit the thermal flux transmitted by the ambient medium to the heat-sensitive element and to increase the precision of the measurement of the temperature of the support on which the device is fixed.

According to another variant of the invention, the device according to the invention may be coated with a totally opaque film 12 adhering to elements 10 or 11, which has for its object to completely eliminate the penetration of the ultra-violet radiation within the heat-sensitive substance which might alter the sensitivity of said substance. The opaque film 12 is disposed semi-permanently near the heat-sensitive element 3 and is removed in the period preceding use of the temperature indicator device.

FIG. 3 shows a view in section of a bottle 13 provided with a device according to the invention, said device being fixed on bottle 13 via an adhesive substance 14 which intimately and continuously fixes the device to the bottle 13. This serves to to limit to a maximum the thermal impedance between said bottle and the heat-sensitive element, and to increase the precision of the measurement of the temperature of the support on which the device is fixed.

It will be readily understood that the device according to the invention presents considerable advantages. For example, the presence of one sole heat-sensitive substance leads to very low production costs, with the result that said devices may be considered as disposable products which may be affixed in large numbers on bottles not re-used directly for the same function. It is to be noted that, as the devices according to the invention are very generally not re-used, they may advantageously be fixed on the bottles during the operation for affixing the labels usually placed on the bottles containing liquids intended for human consumption.

The extreme ease of use of the device should also be noted, since the determination of the appropriate temperature of the bottle is effected by simple comparison between the colour of the heat-sensitive zone and the colour in the immediate vicinity of the mark 5, this in the absence of figures or words which would have for its effect to hinder comprehension of the functioning of the device in the case of the user not being familiar with the language used for expressing the words, which is particularly the case of bottles of French wines exported abroad.

Of course, the invention is not limited to the embodiment described and shown which has been given only by way of example. In particular, it includes all the means technically equivalent to the means described, as well as their combinations, if they are executed in accordance with its spirit and carried out within the scope of protection as claimed.

I claim:

1. A device for attachment to a bottle or the like which contains a liquid or other material, for purposes of indicating when the bottle is at a particular temperature most suitable for consumption of the contents of the bottle, said device comprising a thin support having an adhesive substance on a first surface thereof for attachment of said device to said bottle, and a temperature sensing element on the second surface, said temperature sensing element comprising a mixture of cholesteric crystals printed on said second surface, said mixture having a transition phase between the smectic and cholesteric phases of from 6°–15° C., said support further comprising colored areas adjacent to said sensing element, said colored area being of a succession of colors which successively correspond to the colors of the sensing element between 6° and 150° C., and wherein one of said colored areas is a marked area which identifies it as corresponding to the temperature which is most suitable for consumption, and a transparent layer covering at least said sensing element to insulate said sensing element from moisture, and wherein said transparent layer thermally insulates said sensing element from ambient temperature and has a thickness of between 150–600 microns, said device further comprising two arrows adjacent to said-colored areas on opposite sides of said marked area, each of said two arrows pointing towards said marked area in a manner so as to indicate to an observer whether the temperature being sensed by the device is too high or too low, and whether further cooling or heating is required.

2. The device as defined by claim 1 further comprising an opaque adhesive film on said second surface which extends at least over said sensing element, said film being removable before use of the device on the container.

3. The device as defined by claim 1 wherein said sensing element comprises a uniform and regular layer of liquid crystals having a thickness between 2.5 and 100 microns.

4. The device as defined by claim 3 wherein said sensing element has a sensing area between 0.8 and 35 square centimeters.

5. The device as defined by claim 1 wherein said heat sensing element is printed onto and surrounded by a black background on said flexible support.

6. The device as defined by claim 1 wherein said heat sensing element is printed on a black background, and wherein each of said colored areas is arranged in an arc, defining a portion of a circle having said marked element therein to facilitate ease of comparison between said sensing element and said colored areas.

* * * * *